United States Patent [19]
Gleim et al.

[11] Patent Number: 5,793,172
[45] Date of Patent: Aug. 11, 1998

[54] MOTOR CONTROLLER ELECTRONICALLY COMMUTATED DC MOTORS IN ORDER TO COMPENSATE FOR TORQUE DROPS

[75] Inventors: Guenter Gleim, Villingen; Hermann Link, Donaueschingen, both of Germany

[73] Assignee: Deutsche Thomson Brandt GmbH, Villingen-Schwenningen, Germany

[21] Appl. No.: 728,015

[22] Filed: Oct. 9, 1996

[30] Foreign Application Priority Data

Nov. 10, 1995 [DE] Germany ............... 195 41 832.8

[51] Int. Cl.[6] .................. H02P 6/10; H02P 7/36; H02P 8/00
[52] U.S. Cl. .................. 318/439; 318/430; 318/254
[58] Field of Search .................. 318/138, 139, 318/254, 245, 283, 289, 599, 603; 388/817, 934; 363/98, 41

[56] References Cited

U.S. PATENT DOCUMENTS

| | | | |
|---|---|---|---|
| 4,146,827 | 3/1979 | Krohn | 318/341 |
| 4,189,732 | 2/1980 | Atwater | 318/677 |
| 4,710,686 | 12/1987 | Guzik | 318/293 |
| 4,763,052 | 8/1988 | Lundin et al. | 318/254 |
| 4,819,597 | 4/1989 | Gale et al. | 318/599 |
| 4,823,056 | 4/1989 | Watanabe et al. | 318/599 |
| 4,833,374 | 5/1989 | Watanabe et al. | 318/254 |
| 4,860,186 | 8/1989 | Maekawa et al. | 363/41 |
| 4,879,641 | 11/1989 | Rossi et al. | 363/98 |
| 4,884,183 | 11/1989 | Sable | 363/41 |
| 4,893,067 | 1/1990 | Bhagwat et al. | 388/817 |
| 4,928,049 | 5/1990 | Pietrobon et al. | 318/685 |
| 4,959,601 | 9/1990 | Kikugawa | 318/696 |
| 5,032,780 | 7/1991 | Hopkins | 318/696 |
| 5,125,067 | 6/1992 | Erdman | 388/934 |
| 5,166,591 | 11/1992 | Stephens et al. | 318/701 |
| 5,296,792 | 3/1994 | Knierim | 318/685 |
| 5,343,382 | 8/1994 | Hale et al. | 363/98 |
| 5,352,986 | 10/1994 | Modgil et al. | 330/10 |
| 5,376,866 | 12/1994 | Erdman | 318/254 |

FOREIGN PATENT DOCUMENTS

| | | |
|---|---|---|
| 0071941 | 1/1986 | European Pat. Off. . |
| 0412180 | 2/1991 | European Pat. Off. . |
| 4420317 | 12/1995 | Germany . |

*Primary Examiner*—Paul Ip
*Attorney, Agent, or Firm*—Joseph S. Tripoli; Frederick A. Wein

[57] ABSTRACT

In the case of a motor controller for electronically commutated DC motors, an additional current and/or an additional voltage is passed at the commutation instant to that winding of the motor which is active at that time, in order to prevent torque drops. In order to compensate for torque drops at different motor loads, the duration and/or amplitude of the additional current and/or of the additional voltage are/is determined from the actual motor load.

11 Claims, 3 Drawing Sheets

1

MOTOR CONTROLLER ELECTRONICALLY COMMUTATED DC MOTORS IN ORDER TO COMPENSATE FOR TORQUE DROPS

FIELD OF THE INVENTION

The invention relates to a motor controller having electronic commutation which is connected to the windings of a motor, a predetermined additional current being connected to that coil of the motor which is active at that moment, from the commutation instant, in order to prevent torque drops.

DESCRIPTION OF THE RELATED ART

U.S. Pat. No. 4,511,827 discloses a controller which drives an electronically commutated motor such that torque fluctuations are suppressed. This device in this case comprises a sensor for determining the rotor position, in other words the commutation instant, and a controller which processes this signal so that the corresponding coil is supplied, from the commutation instant, with additional current in order to prevent a torque drop.

However, it has been found in the case of the known solution that the supply of a predetermined current to the coil compensates for the torque drops only within a specific motor current range. However, for example, in a video recorder, the known method does not provide satisfactory results since, in an operating mode (for example play or long-play), the currents may be very different because of different mechanical loads, for example in the case of different temperatures or cassettes.

The invention is thus based on the object of providing a motor controller in which torque drops are avoided even in the event of different motor loads.

SUMMARY OF THE INVENTION

The object is achieved by the features of claim 1. Preferred refinements of the invention are specified in the subclaims.

According to the invention, in the case of a motor controller for electronically commutated DC motors, in which an additional current is connected to the active coil, from the commutation instant, in order to prevent torque drops, the duration and/or amplitude of the additional current pulse are/is determined as a function of the motor load. In other words, the duration and/or amplitude of the additional current pulse are/is variable and are/is derived from the load on the motor, the additional current pulse being longer (greater) the higher the motor load, as is self-evident.

This advantageously results in torque drops being compensated for automatically and optimally, irrespective of the production scatter between motors, the temperature ranges and ageing.

The motor controller according to the invention normally controls the motor by means of so-called pulse-width modulation (CPWM or PWM) of the control pulses. The PWM signal of the motor controller is held at "1" for the duration of the additional current. The commutation instant, from which the additional current is applied, can be determined by a sensor.

The motor load is determined from the motor current drawn, it being possible to determine the motor current, for example, by means of a measurement resistor which is connected in the motor circuit or from the ratio of the pulse duration to the pulse pause of the PWM signal.

Furthermore, the controller according to the invention may have an integrator which produces a control signal (S) from the duty ratio of the CPWM signal. The start of the integration of the CPWM control signals is likewise brought about by the occurrence of the commutation signal.

The controller advantageously has a flipflop whose Q output is connected to the CPWM control signals via an "OR" gate, so that the Q output is switched to logic "1" on the occurrence of the commutation signal, the Q output of the flipflop being reset again when the control signal corresponds with a reference voltage. The comparison between the reference voltage and the control signal is preferably carried out by means of a differential amplifier. This also brings about the end of the integration of the CPWM signals.

BRIEF DESCRIPTION OF THE DRAWINGS

A preferred embodiment of the invention will be explained in the following text with reference to the figures, in which.

DETAIL DESCRIPTION OF THE INVENTION

Figure 1:
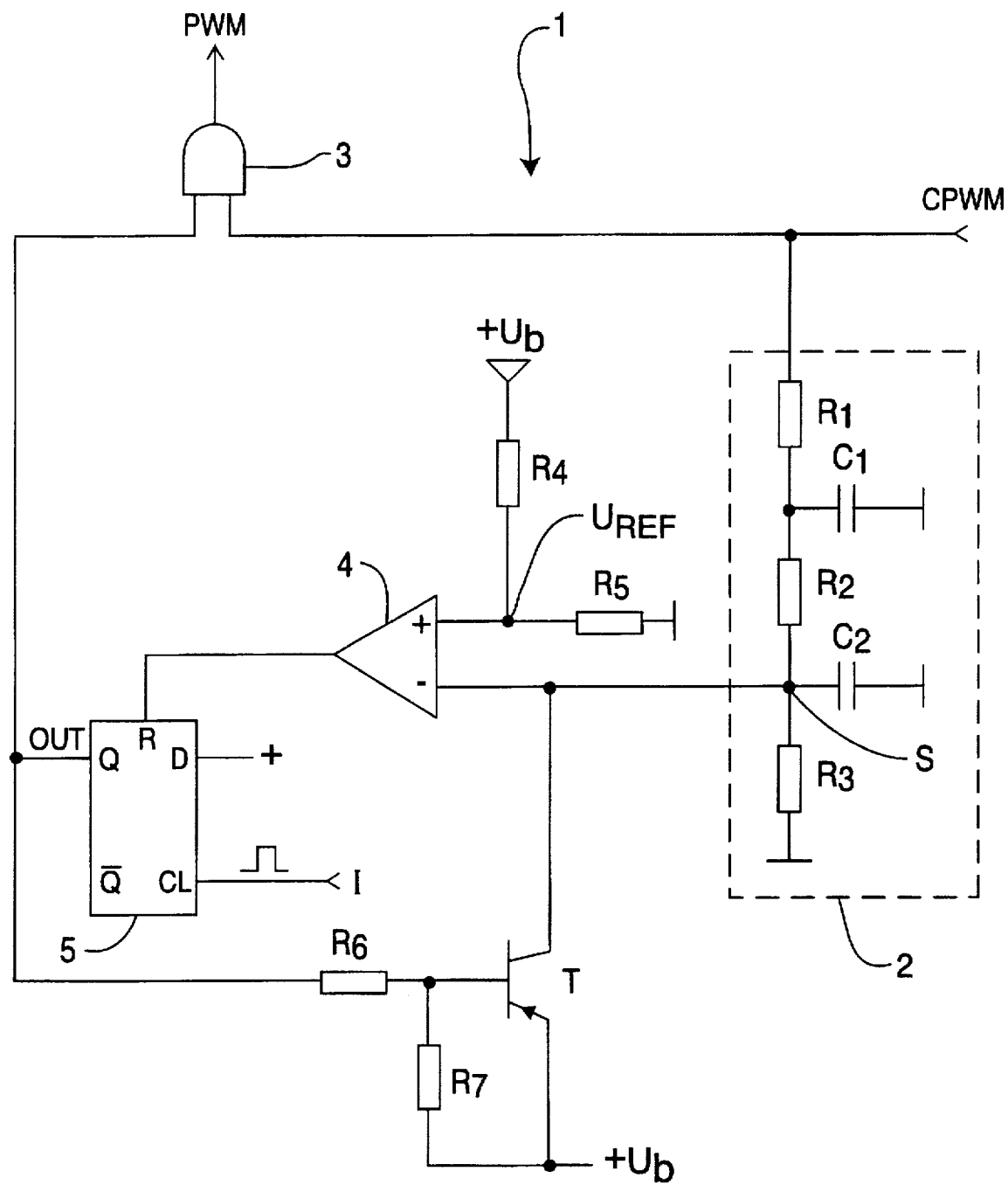
FIG. 1 shows a circuit diagram of the compensation section, according to the invention, of the motor controller.

FIG. 1 shows the logic circuit for compensating for torque drops in digitally driven, electronically commutated motors. A digital motor control signal CPWM, in which the motor load can be derived from the duty ratio, is passed to the input of the compensation circuit 1. A control signal S is derived from this signal CPWM by means of an integrator 2. The integrator 2 preferably comprises three serial resistors $R_1$, $R_2$ and $R_3$, as well as two capacitors $C_1$ and $C_2$. $C_1$ being arranged electrically between earth (reference-earth potential) and the junction of $R_1$ and $R_2$, and $C_2$ being arranged electrically between earth and the junction of $R_2$ and $R_3$, and the control signal S being formed on $C_2$. The control signal CPWM for controlling the motor, which is not illustrated, is furthermore passed to an input of an OR gate 3, so that a PWM control signal appears at the output of the OR gate 3 and is supplied to PWM power stages, which are likewise not illustrated, in order to provide the motor current in the individual motor coils or windings.

The control signal S which is produced by the integrator 2 is supplied to the inverting input of a differential amplifier which is designed as a comparator 4 and to whose non-invertng input a reference voltage $U_{REF}$ is applied, which is defined via a voltage divider composed of resistors $R_4$, $R_5$. The output of the comparator 4 is passed to the reset input of a flipflop 5, which is formed by a D flipflop. The D input of the flipflop 5 is at positive potential which can be derived, for example, from an operating voltage $U_b$. The occurrence of the commutation signal I for the motor drive activates the flipflop 5 via the clock input, so that a logic "1" appears at the Q output. The Q output of the flipflop 5 is passed to the other input of the OR gate 3. As a result of the CPWM signal being linked to the Q output by means of this OR circuit, the PWM signal for the power stages is in consequence held at logic "1" or at the "High" level, so that an additional current is supplied to the motor windings. The Q output of the flipflop 5 remains at logic "1" until logic "1" appears at the output of the comparator 4, so that the flipflop is reset via the reset input R of the flipflop 5 and, in consequence, a logic "0" appears at the Q output or the Q output is held at the "low" level. An npn transistor T is connected between the inverting input of the comparator 4 (control signal S) and the Q output of the flipflop 5, such that the base is connected to the Q output via a resistor $R_6$. The emitter of the transistor T, which is at the positive potential of the operating voltage $U_b$, is connected to the base via a resistor $R_7$, while the collector of transistor T is connected to the inverting input of the comparator 4. When the Q output of the flipflop 5 switches up to logic "1", the transistor T is switched off, while a logic "0" at the Q output of the flipflop 5 opens the transistor T, or switches it on.

The transistor T thus acts as an electronic switch by means of which the capacitor $C_2$ on which the control signal S is formed can be charged to the positive potential of the operating voltage $U_b$, depending on the logic signal state at the Q output of the flipflop 5, or, when the Q output is switched to logic "0" or the "low" level, can be discharged to the potential which results on the capacitor $C_1$ as a result of the continuous integration of the CPWM signals which are continuously supplied via the resistor $R_1$. The discharge time constant of the capaciator $C_2$ is in this case essentially determined by the parallel circuit formed by the resistor $R_3$ and the resistor $R_2$, the latter of which forms a series circuit with the capacitor $C_1$ for discharging. The charging time constant of the capacitor $C_2$ is determined by the resistance of the switched-on emitter-collector path through the transistor T.

Figure 2A:
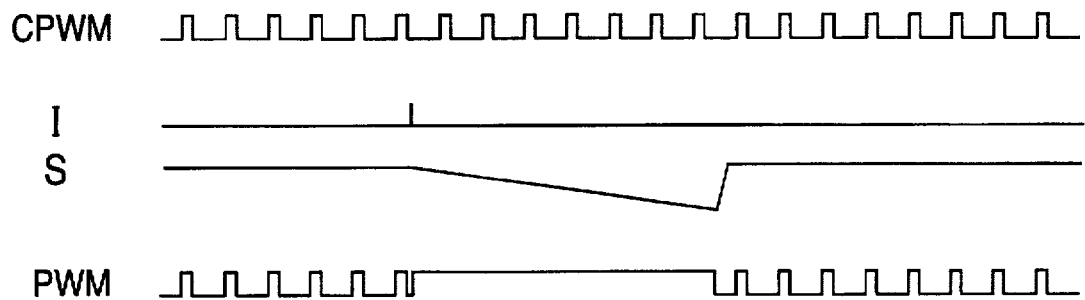
FIGS. 2a and 2b show timing diagrams of the input and output signals required for control purposes.
Figure 2B:
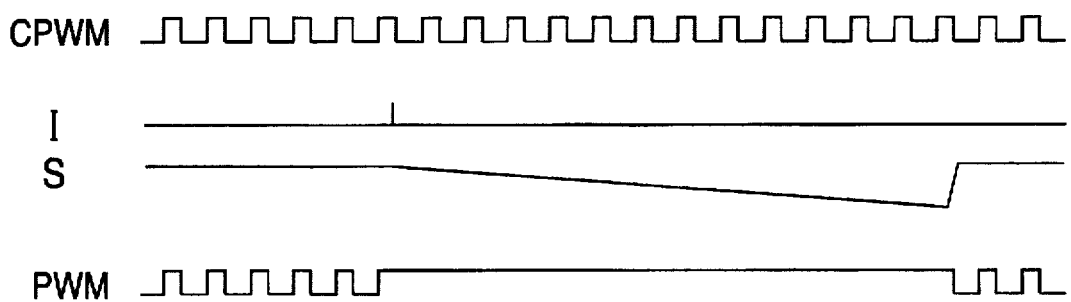

FIGS. 2a and 2b show the waveform of the various control signals with respect to time, FIG. 2a illustrating the case when the motor load is low, and FIG. 2b illustrating the case when the motor load is high. The upper clock waveform in FIG. 2a shows the motor control signal CPWM, the duty ratio being relatively low. When the commutation signal I occurs, the Q output of the flipflop 5 is switched to the "High" level, so that the transistor T is switched off and defines the start of production of the control signal S. This means that the voltage on the capacitor $C_2$, which corresponds to the control signal S, in consequence falls until the flipflop 5 is reset via the R input. This results in the lower clock waveform at the output of the OR gate 3, that is to say the output of the OR gate 3 is logic "1" for the duration of the current control signal S, which means a positive potential with respect to the reference-earth potential in the present case, while logic "0" is, for example, the reference-earth potential.

FIG. 2b shows the same situation as FIG. 2a, but with the motor control signal CPWM having a higher duty ratio. As a result of the higher duty ratio of the motor control signal CPWM, the capacitor $C_1$ is charged to a higher voltage in comparison with the situation according to FIG. 2a. The consequence of this is that the capacitor $C_2$ is discharged more slowly and the waveform of the current control signal S also lasts for a longer time, so that the time period for which the output of the OR gate 3 remains at logic "1" is significantly longer.

Figure 3A:
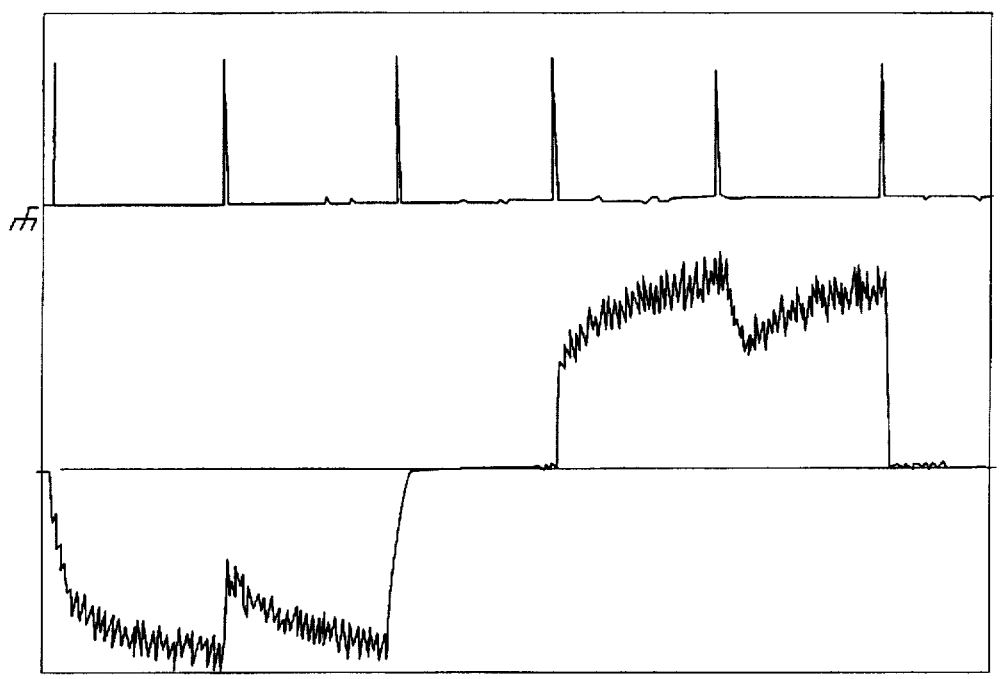
FIGS. 3a and 3b show the current waveform in an electronically commutated motor, respectively without and with compensation.

FIG. 3a shows the current waveform in one of the motor windings without the compensation according to the invention for torque drops. The upper part illustrates the instants of commutation. The lower part shows the current waveform as a function of time. It can clearly be seen that drops occur in the current waveform and thus also in the torque waveform of a motor at the commutation instants.

Figure 3B:
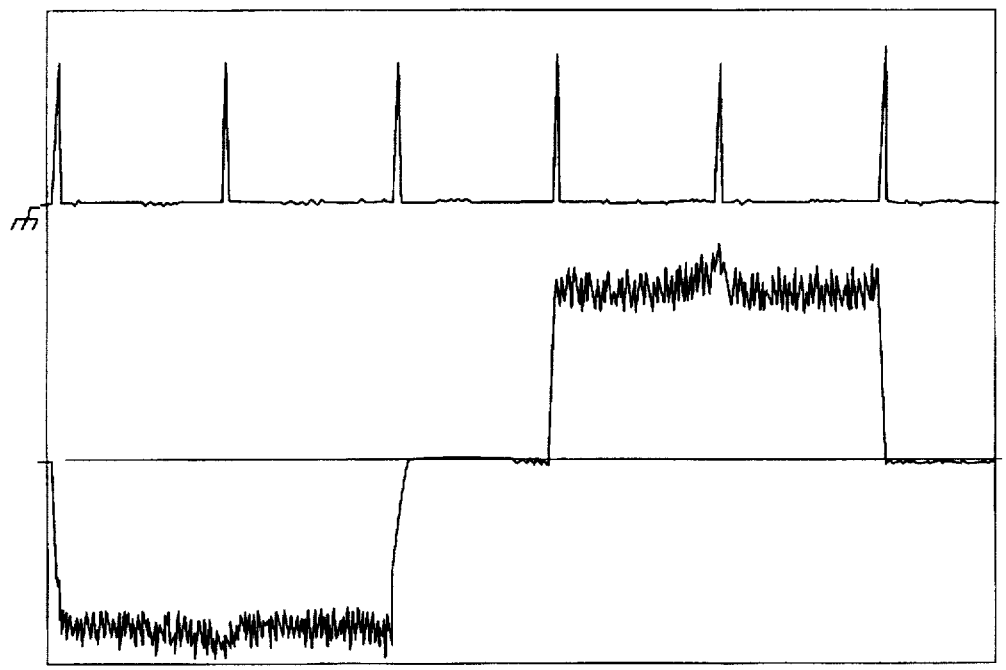

In contrast to this, FIG. 3b shows the current waveform in one of the motor windings where current and/or voltage compensation are/is used in order to avoid torque drops. The current waveform, and thus the torque waveform of the motor, is approximately constant at the commutation instants.

We claim:
1. A controller for driving an electronic commutated DC motor with a suppressed torque ripple activated by a first control signal comprising:
  sensor means for determining the commutation instant of said DC motor and generating a commutation signal indicative of the commutation instant;
  integration means for integrating said first control signal to provide an output control signal indicative of the duty ratio of said first control signal;
  signal means responsive to said first control signal for providing a motor control signal for controlling the motor current and/or voltage in the windings or coils, wherein said motor control signal provides a corresponding current and/or voltage indicative of said first control signal during a first time period; and
  means for modifying said motor control signal according to the commutation signal and output control signal, wherein said modified motor control signal provides an additional corresponding current and/or voltage connected to the active motor winding during a second time period beginning from the commutation instant, and wherein the duration and/or amplitude of the additional current and/or voltage is derived from the motor load.

2. The motor controller according to claim 1, wherein said first control signal is a CPWM signal.

3. The motor controller according to claim 2, wherein said motor control signal is a PWM signal.

4. The motor controller according to claim 3, wherein the PWM signal is held at logic '1' for the duration of the second time period corresponding to the additional current and/or voltage.

5. The motor controller according to claim 4, wherein the motor load is determined from the motor current drawn.

6. The motor controller according to claim 5, wherein the motor current is determined by a measurement resistor in the motor current.

7. The motor controller according to claim 3, wherein the motor current is determined from the ratio of the pulse duration to the pulse pause in the PWM signal and/or from the motor rotation speed.

8. The motor controller according to claim 4, wherein said signal means includes an OR gate for receiving the CPWM first control signal at a first input and the output of said modification means at a second input and wherein said modification means for modifying the motor control PWM signal includes a flip-flop having a Q output wherein the Q output together with the CPWM first control signal forms the input of the OR gate of said signal means and wherein the Q output is switched to logic 1 upon the arrival of the commutation signal and is reset when the output control signal corresponds to a value which does not exceed a reference voltage ($U_{REF}$).

9. The motor controller according to claim 8, wherein said modification means further includes a comparator comprising a differential amplifier for comparing the reference voltage ($U_{REF}$) and the output control signal for resetting the Q output of said flip-flop when the control signal corresponds with the referenced voltage.

10. The motor controller according to claim 9, wherein said integration means comprises three serial resistors $R_1$, $R_2$, $R_3$, and Q capacitors, $C_1$, $C_2$, wherein capacitor $C_1$ is electrically coupled between a ground potential and the junction of $R_1$ and $R_2$, and wherein $C_2$ is electrically coupled between ground potential and the junction of $R_2$ and $R_3$, wherein said output control signal is formed on capacitor $C_2$.

11. The motor controller according to claim 10, further comprising a transistor coupled between said integration means and said modification means and operable as an electronic switch, wherein the capacitor $C_2$ on which the output control signal is formed is charged to a positive potential of an operating voltage $U_b$ depending on the logic signal state at the Q output of the flip-flop and wherein said Q output is switched to logic "0" and discharged to the potential which results on the capacitor $C_1$ of said integration means.

* * * * *